United States Patent

Hill

[11] Patent Number: 5,960,532
[45] Date of Patent: Oct. 5, 1999

[54] PROCESS FOR MANUFACTURING A MULTIPHASE MACHINE WITH NON-SALIENT POLES

[76] Inventor: Wolfgang Hill, Ortenbergstrasse 3, 76135 Karlsruhe, Germany

[21] Appl. No.: 08/430,846

[22] Filed: Apr. 6, 1995

[30] Foreign Application Priority Data

Oct. 9, 1992 [DE] Germany ............................. 42 34 108
Sep. 30, 1993 [WO] WIPO ...................... PCT/EP93/02677

[51] Int. Cl.[6] .................................................. H02K 15/06
[52] U.S. Cl. ............................... 29/596; 29/606; 310/42; 310/43
[58] Field of Search .............................. 29/596, 598, 606, 29/609; 310/42, 43, 216–218

[56] References Cited

U.S. PATENT DOCUMENTS

| | | | |
|---|---|---|---|
| 2,278,139 | 3/1942 | Puchy | 29/596 X |
| 3,328,617 | 6/1967 | Preece | 29/596 X |
| 3,809,938 | 5/1974 | Sjoberg et al. | 29/596 X |
| 3,827,141 | 8/1974 | Hallerback | 29/596 |
| 3,932,928 | 1/1976 | King | 29/596 |
| 4,712,035 | 12/1987 | Forbes et al. | 29/596 X |
| 5,319,844 | 6/1994 | Huang et al. | 29/598 |

*Primary Examiner*—Carl E. Hall

[57] ABSTRACT

In a process, a self-supporting winding is prefabricated independently from the soft magnetic body, the wire windings are impregnated with an insulating compound, compressed from the center of the teeth, and clamped before the insulating compound sets.

5 Claims, 7 Drawing Sheets

PROCESS FOR MANUFACTURING A MULTIPHASE MACHINE WITH NON-SALIENT POLES

BACKGROUND OF THE INVENTION

1. Field of the Invention

The invention concerns a manufacturing process for a multiphase electric machine with overlapping phase conductors and at least one slotted soft magnetic body which is composed of segments.

2. Description of the Prior Art

In a conductor design of a multiphase machine with non-salient poles the phase conductors intersect in the winding overhangs which significantly complicates their manufacture in comparison to single-phase or concentrated windings. A high space factor in the grooves and short connecting paths in the winding overhangs are essential conditions for the increase of power density and efficiency of electric machines.

German Patent No. 2,033,906 describes a process where the overlapping conductor lanes are wound around the teeth which are temporarily fixed in their final position by a device, thereby permitting the insertion of the conductors at the motor with internal rotor through an enlarged opening on the bottom of the groove, because the yoke is pressed on only thereafter.

From German Patent 2,033,235 a process is known in which soft magnetic segments are radially inserted into a multiphase two-layer winding wherein the flexible wire-wound coils must be ductile during assembly and stability of the construction is ensured by sealing with an insulating compound. Short paths for the electric and magnetic flow are not attainable in this process. Further, the insertion of the segments requires a high degree of skill and, therefore, is costly to automate.

The invention is based on the objective to advance the development of a process for the manufacture of a multiphase electric machine wherein the conductor lanes overlap in the winding overhangs in such a manner that a high space factor and short conductor lengths in the grooves and winding overhangs, as well as good utilization of material and simple recoverability of the raw materials used is achieved in a few well automated steps.

SUMMARY OF THE INVENTION

In accordance with the invention, this objective is achieved by the characteristic elements of claim No. 1. Windings from round or profiled wire, pulled coils or square bars are, in accordance with the invention, prefabricated as self-supporting structures prior to insertion of the soft magnetic segments wherein the conductors within an arrangement, prior to hardening of a binding agent, are compressed in axial direction starting from the central axis of the teeth—or in wire windings also in tangential and/or radial direction. In the process, therefore, the eliminated restriction by the soft magnetic body is utilized to prefabricate particularly compact self-supporting windings. The improved utilization of space available makes machines of equal nominal power and efficiency smaller and lighter.

If the teeth are arranged within the yoke and the width of the teeth toward the air gap remains constant, one T-shaped segment design suffices. For teeth arranged outside the yoke, two T-shaped segment designs are necessary.

However, if the width of the teeth is to increase toward the air gap, one tooth segment design and one respective yoke segment design are necessary in which the tooth segments are radially fixed by their trapezoidally widened ends on the side toward the yoke either by means of the yoke segments themselves or by means of a carrier ring, said carrier ring abutting the yoke and having corresponding grooves.

The segments inserted into the conductor assembly can be removed at any time without destroying the winding. This provides new repair possibilities and the separation of copper and iron can be achieved by fully automated disassembly without residues or costly cutting and melting processes.

The description is based on a brushless radial air gap machine with configuration of its multiphase winding in the stator. The manufacturing process is, of course, also applicable to mechanically commutated machines in which the winding is rotating, or to machines with a level air gap or with a short-circuit rotor.

The drawings present advantageous embodiments of the invention.

DETAILED DESCRIPTION OF THE PREFERRED EMBODIMENT

Figure 1:
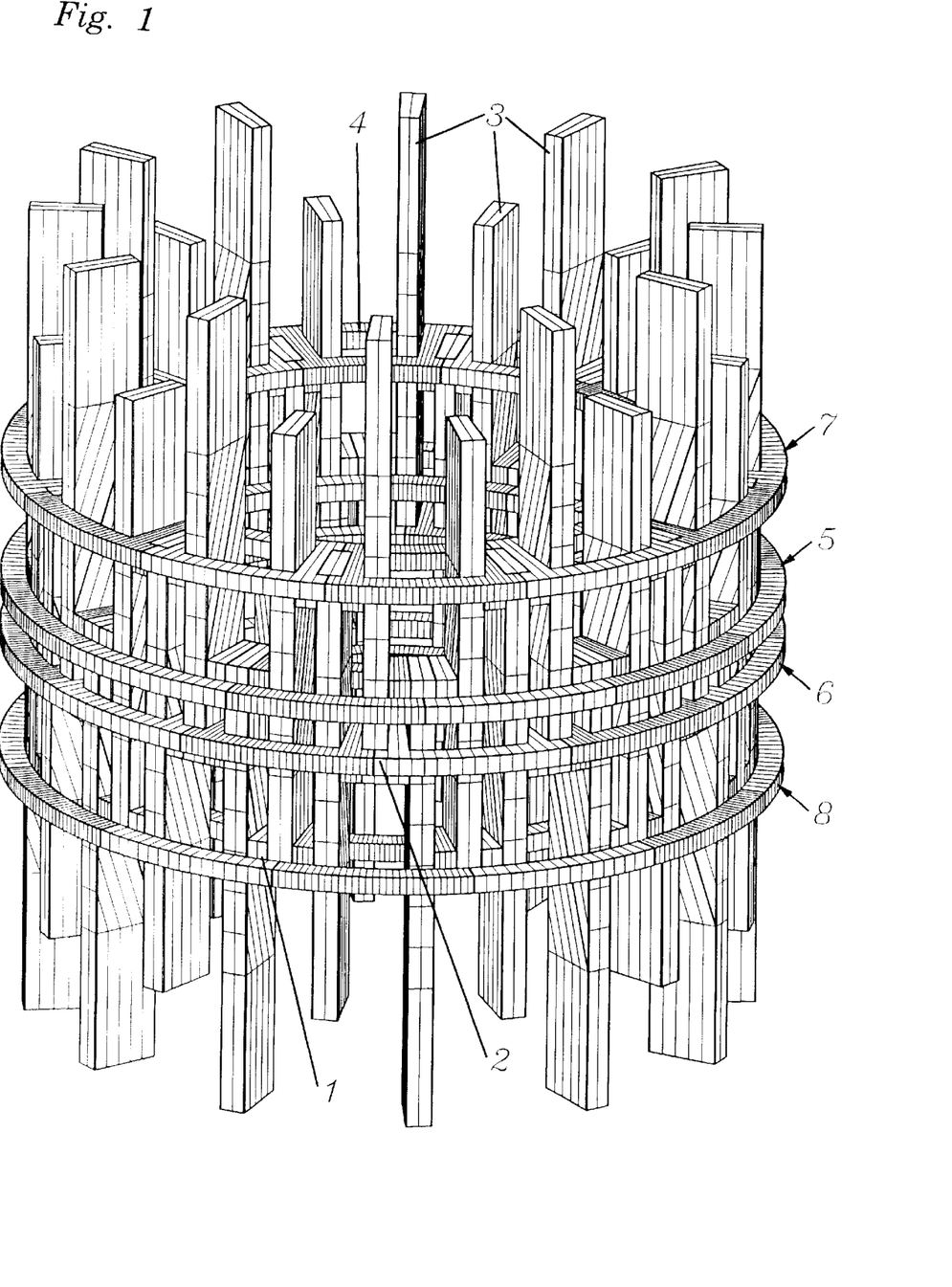
FIG. 1 shows the four unitary layers of a four-phase, twelve-pole bar winding during pushing together in axial direction.
Figure 2:
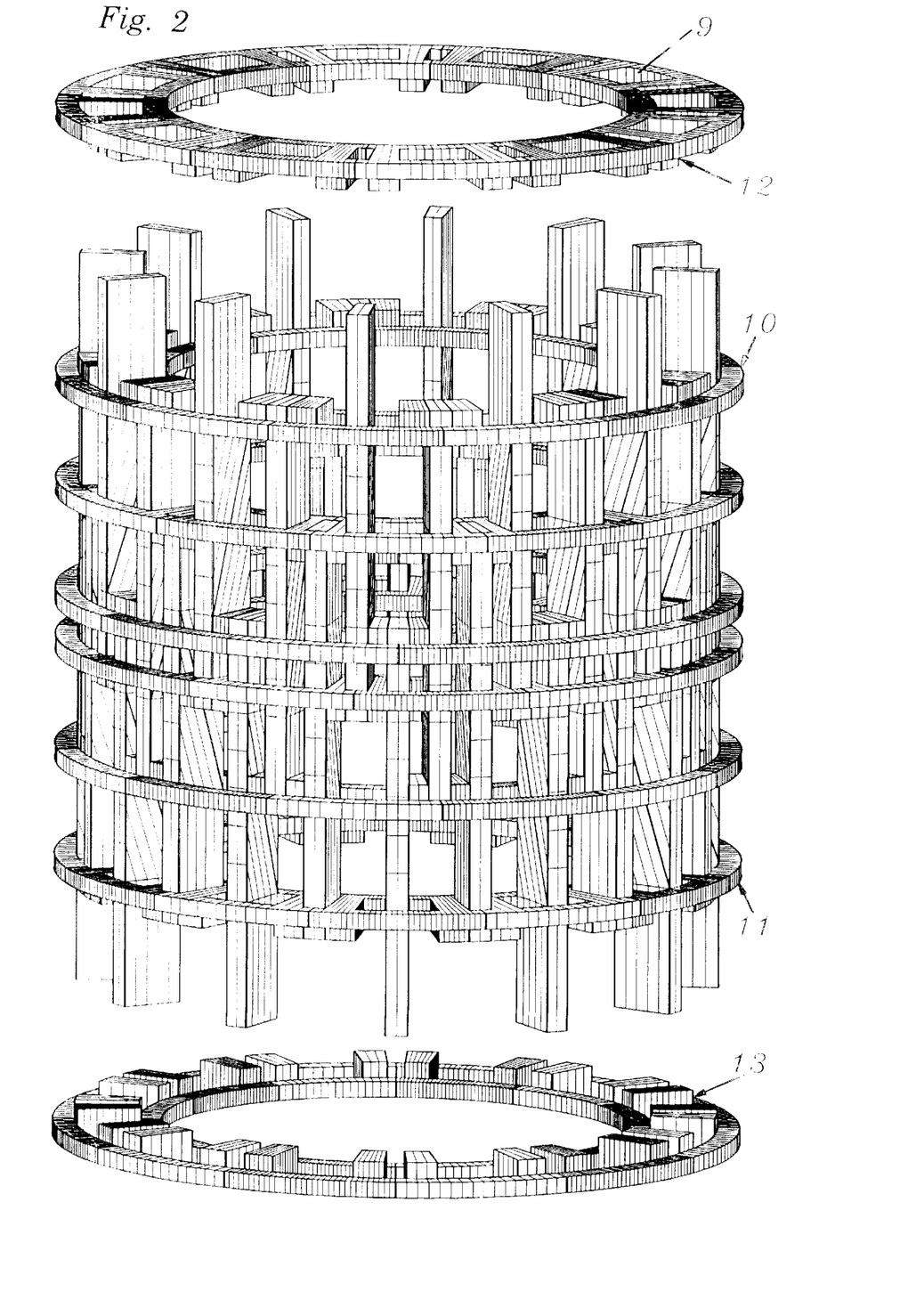
FIG. 2 shows the joining of the connecting conductor layers to the units from FIG. 1.
Figure 3:
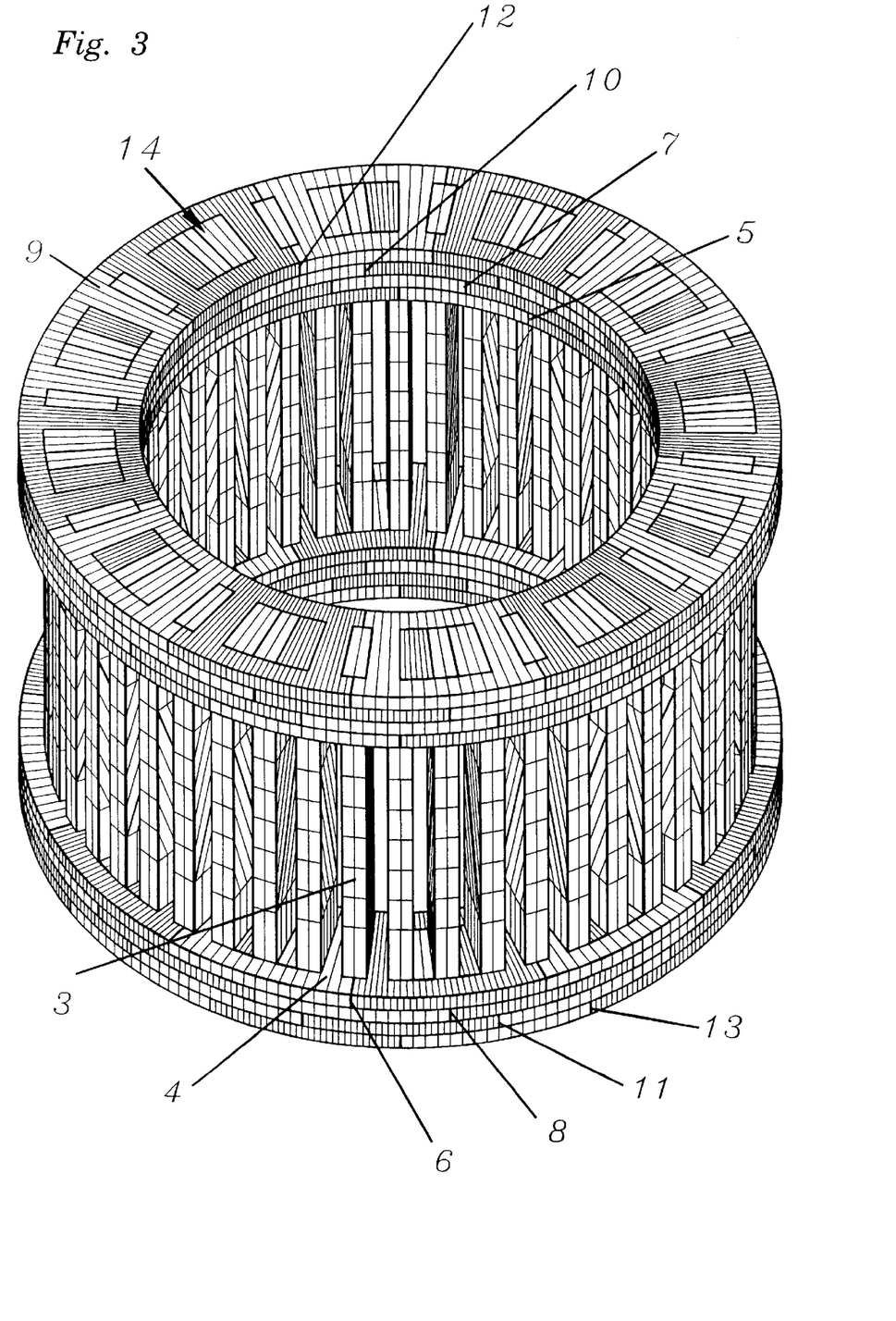
FIG. 3 shows the pushed together self-supporting prefabricated bar winding.

FIGS. 1 through 3 depict three work steps in the manufacture of a self-supporting bar winding for a twelve-pole, four-phase radial air gap machine.

FIG. 1 shows how units (1,2) which have been previously joined into layers are axially pushed together. The two unitary structural designs (1,2) are prefabricated by welding two divided bars (3) each to connecting conductors (4). The four unitary yoke layers (5 through 8) consist each of identical structural conductor parts which in turn belong to a conductor lane or, respectively, to a phase.

In FIG. 2 the outer connecting conductors (9) which previously also have been tangentially glued together into layers are now axially pressed onto the ends of the units. Except for the supply conductors which are not shown the connecting conductor layers (10 through 13) consist of identical structural conductor parts (9). The two outer connecting conductor layers (12,13) are pressed on axially only after all junctures of the two inner connecting conductor layers (10,11) have been welded or soldered together and a sufficiently small internal resistance of the two conductor lanes has been ascertained. Further, the possibility exists to apply the insulating coating to the unit ends and the outer connecting conductors (9) after joining of the conductor parts but in the axially pushed apart state by immersing the conductor structure into e.g. an insulating lacquer.

FIG. 3 shows the self-supporting prefabricated bar winding (14) in a ready-to-function state after the axial pushing together of the four conductor lanes. By complete utilization of the space available in the compact winding overhangs large conductor cross sections, besides short conductor lengths, are also realizable which increases power density and/or efficiency considerably.

In FIGS. 4 to 8 the work steps and the device elements for the self-supporting prefabrication of a compact wire winding are shown.

Figure 4:
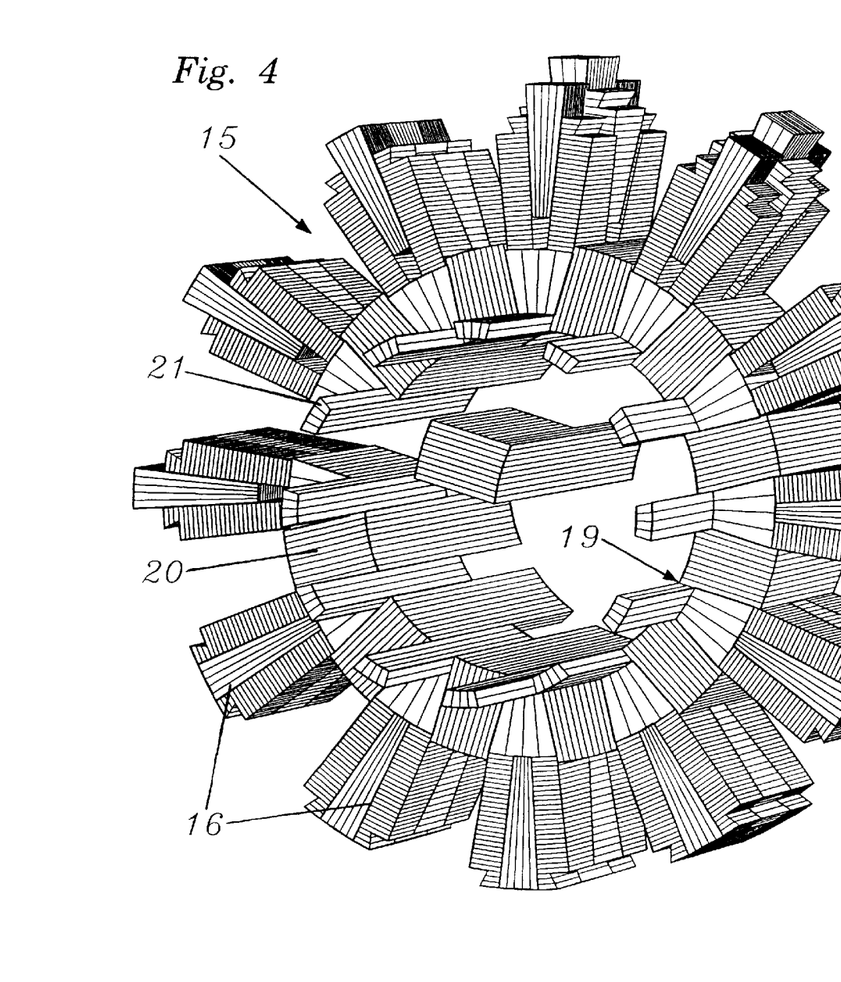
FIG. 4 shows a device for the manufacture of a self-supporting wire winding.
Figures 5, 6:
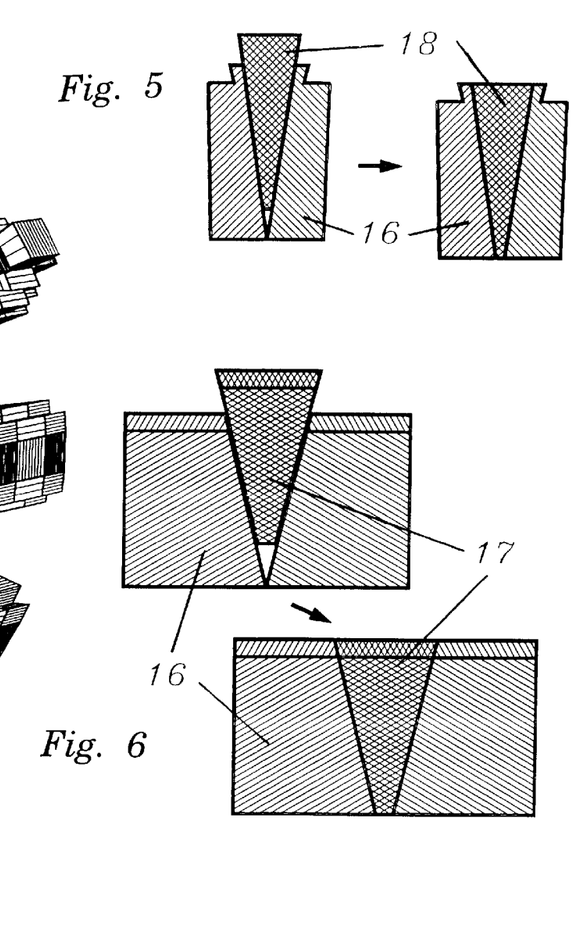
FIGS. 5 and 6 show details of the device depicted in FIG. 4.

The device (15) in FIG. 4 is used for the manufacture of a self-supporting wire winding of a three-phase, four-pole radial air gap machine. After loosely placing the wire coils (not shown) into the twelve identical tooth parts (16) and impregnating them with a binding agent, e.g. a casting resin, the tooth parts are extended by pressing in taper keys (17) in radial direction as well as widened by cotters (18). Prior to setting of the binding agent the wire coils are thus pressed together in the grooves and stretched lengthwise which tenses and compresses the wires in the winding overhangs. The tooth cross section relevant for the magnetic flow is enlarged to the degree permitted by the elasticity of the wire insulation. FIG. 4 shows the tooth parts (16) in their initial as well as their final position, where in this illustration of the principal function of the device only the inner ring (19) is depicted, said inner ring consisting of two sector designs (20, 21) which are radially and axially movable by an electric or hydraulic actuating device.

Figure 7:
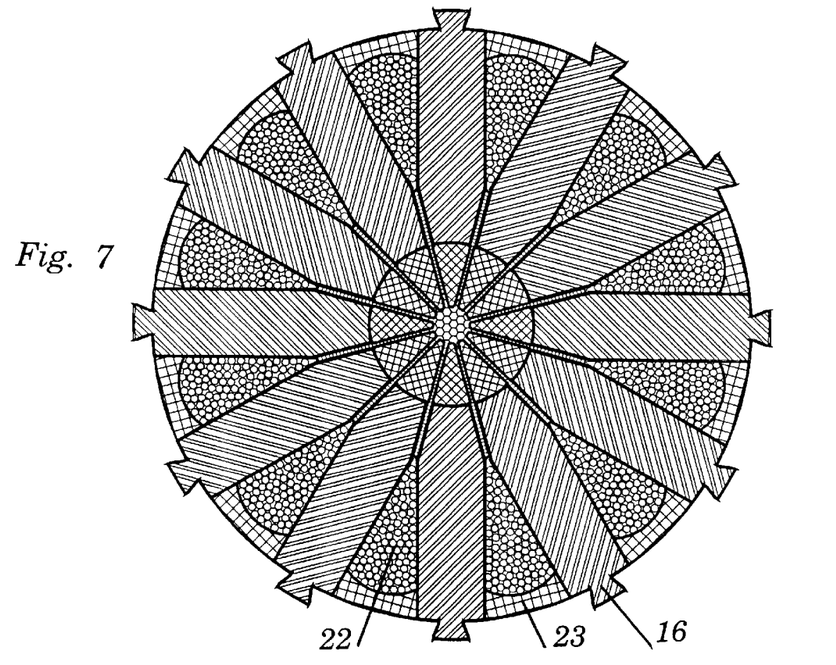
FIGS. 7 and 8 show variations of FIG. 4.
Figure 8:
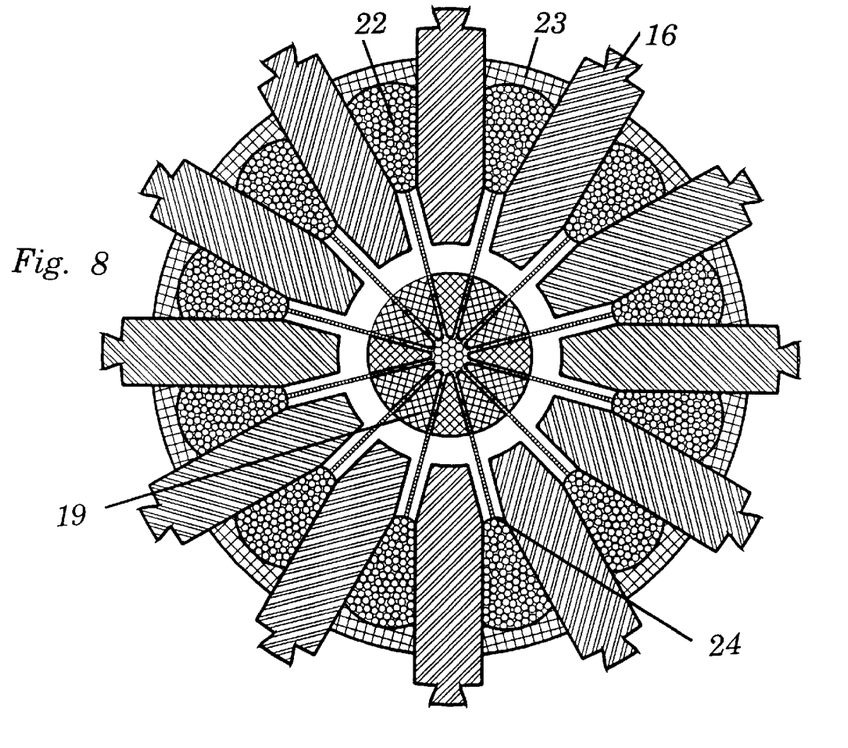

In FIGS. 7 and 8 a wire winding (22) in another variant of the device is in addition radially compressed prior to the setting of the binding agent by first pressing on a claw-shaped enveloping body (23) which pushes the wires inward in radial direction. Subsequently, during pulling the tooth parts (16) radially outward, flexible groove bottom plates (24) are hydraulically pushed outward causing a compaction of wires on the bottom of the groove. All parts of the device (16 through 24) remain now in the final position till the binding agent has set. The set binding agent encases the wiring of the wire winding (22) ensuring a self-supporting conductor structure after the tooth parts (16) to which a non-adhesive coating has been applied have been pulled outward in radial direction and the segments of the inner ring (19) have been pulled out of the wire winding in axial direction. The wire winding (22) is now removed from the device and the parts of the device assume again—possibly after being automatically cleaned—their initial position in order to compress the next winding.

Figures 9, 10:
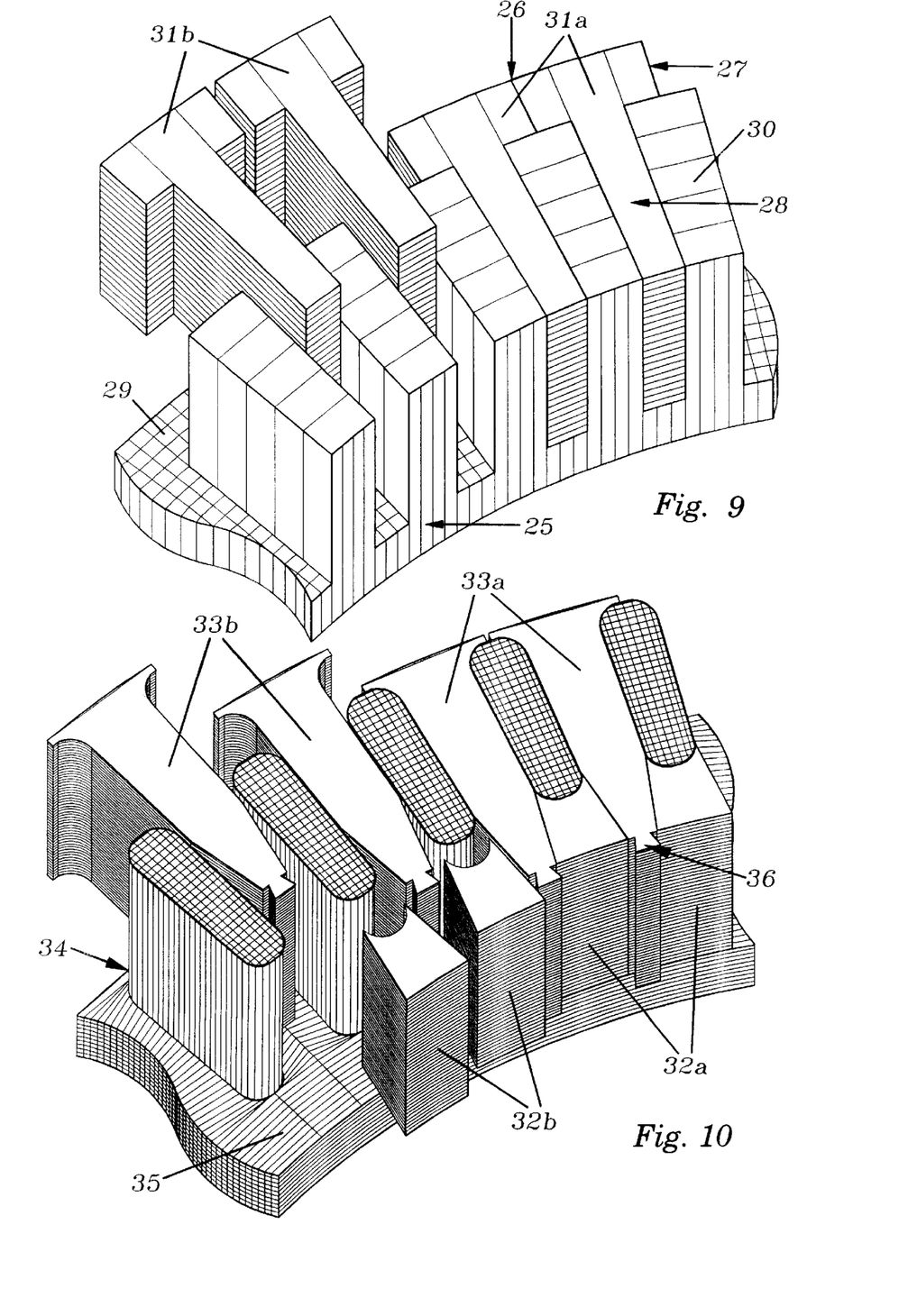
FIG. 9 show four T-shaped tooth segments during insertion into a self-supporting prefabricated bar winding.
FIG. 10 shows tooth segments and yoke segments during insertion into a self-supporting prefabricated wire winding.

FIG. 9 shows a sectional cutout comprising five groove pitches of a self-supporting bar winding (25) for a soft magnetic body (26), the yoke (27) of which is radially arranged outside the teeth (28). For purposes of visualization, the bar winding is shown axially bisected. A winding overhang (29) is schematically depicted on the base by cross hatching and five radially stacked groove bars (30) each fill one groove space. The soft magnetic body (26) is subsequently assembled by radial insertion of T-shaped soft magnetic segments (31a, b). While the two T-shaped segments (31a) on the right are already located in their final position and, therefore, are abutting in the area of the yoke (27), the two segments (31b) continuing to the left are shown during insertion. All segments (31a, b) composing the soft magnetic body are identical.

FIG. 10, in a depiction similar to FIG. 9, yoke segments (32a, b) and tooth segments (33a, b) during insertion into a self-supporting prefabricated wire winding (34) with the yoke being arranged within the teeth. The wire winding (34) occupies the groove space with a high space factor and the winding overhang (35) protrudes radially into the space in front of the yoke in axial direction. Only the two yoke segments (32a) shown on the right are already placed in their final position, while the two yoke segments (32b) are being radially inserted from the inside toward the outside. The two tooth segments (33a) shown on the right are also completely inserted in radial direction while the two tooth segments (33b) on the left are still partially outside the conductor construction. In order to enlarge the contact surfaces to the yoke segments (32a, b) the tooth segments (33a, b) do not terminate at the level of the groove bottom. By increasing the initially decreasing width of the tooth segments (36) toward their ends, the entire construction is radially fixed by a carrier ring which in a final step is pressed on in the axial direction.

Figure 11:
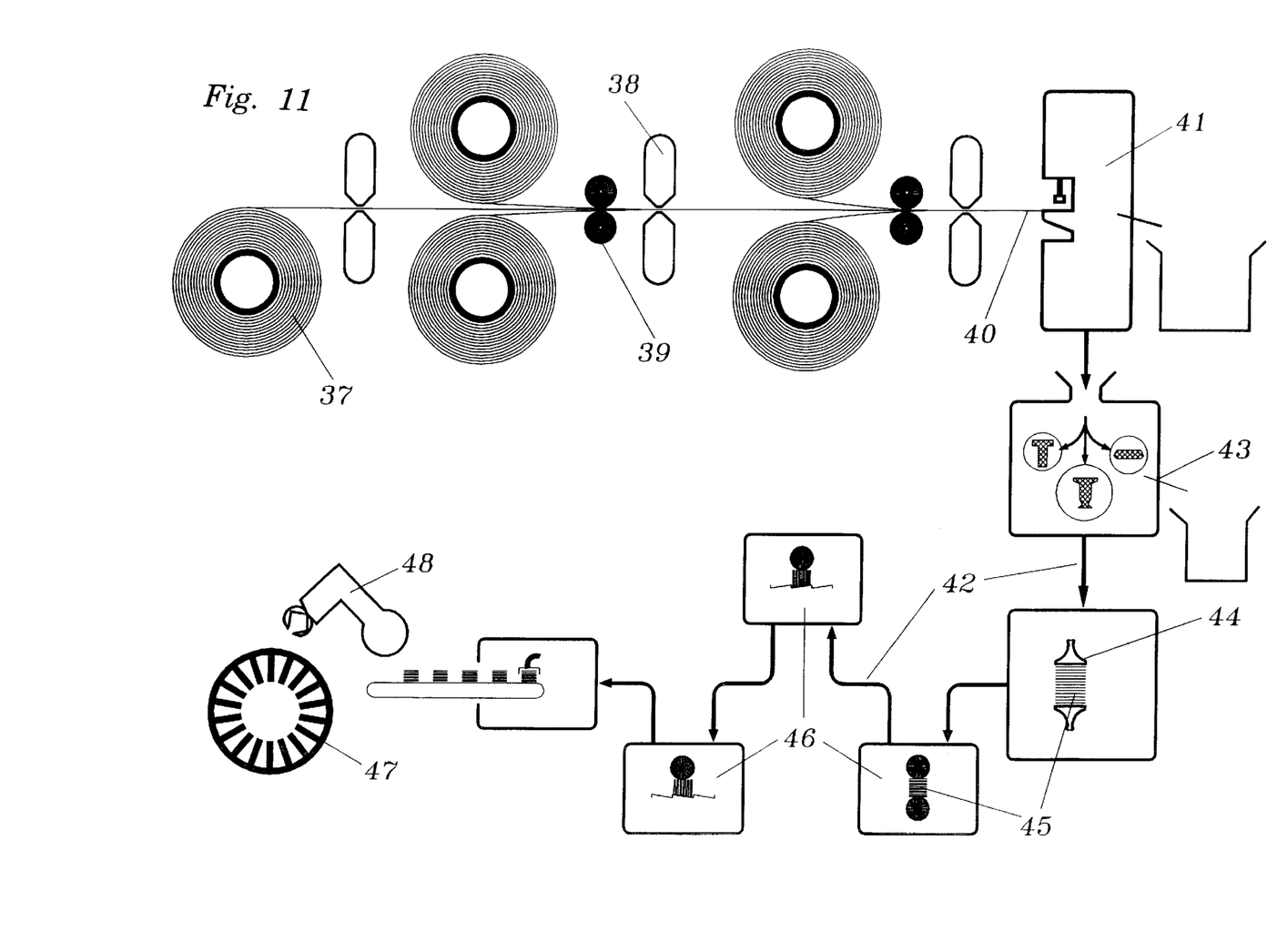
FIG. 11 shows schematically the manufacturing process for a soft magnetic body.

In FIG. 11 the manufacturing process for the soft magnetic body is shown in a diagram. Source material is thin strip of soft magnetic material which on an automated production line is fed from several drums (37), coated at a coating station (38) with insulating and adhesive material, and pressed together by rollers (39) to form a solid multi-layer strip (40). The multi-layer strip is fed directly into a laser cutting or stamping machine (41) in which series by series the soft magnetic segments are being cut out. The thickness of the multi-layer strip (40) or the number of the joined layers respectively can be variably adjusted depending on the size of the segments. The structural parts are distributed by conveyor belts (42) to machines (43) in which the defective pieces are removed, the perfect pieces are counted, and, arranged into segment packets (45) are joined in the desired length in a device (44). The surface roughness caused by the manufacturing tolerances during joining of the stamped parts into segment packets (45) is removed in subsequent finishing steps (46). In the final step the multi-layer segment packets (45) are placed by an assembly robot (48) into the self-supporting prefabricated conductor construction (47).

I claim:

1. A process for manufacturing a multiphase electric machine with overlapping phase conductors, said phase conductors being prefabricated into a self-supporting construction with openings by impregnating said phase conductors with a binding agent and compressing said phase conductors prior to setting of said binding agent by parts of an arranged device, and at least one grooved soft magnetic body, said soft magnetic body being composed of soft magnetic segments and having a cross section and ends, wherein said openings for said soft magnetic segments are enlarged by compressing said phase conductors by said parts of said device and said soft magnetic segments are inserted into said openings of said self-supporting prefabricated conductor construction.

2. A process for manufacturing a multiphase electric machine as recited in claim 1, wherein said phase conductors are composed of pulled coils or groove bars of a bar winding and said pulled coils or groove bars are axially pushed together after said pulled coils or groove bars have been welded or soldered together.

3. A process for manufacturing a multiphase electric machine as recited in claim 1, wherein said phase conductors are composed of conductor wires and, after all said phase conductors have been placed loosely into a device, said device having parts which correspond to said soft magnetic segments, said conductor construction is impregnated with a binding agent and said phase conductor wires, prior to setting of the binding agent, are compressed by an enlargement of the cross section of the parts of said device.

4. A process for manufacturing a multiphase electric machine as recited in claim 1, wherein, after insertion of said soft magnetic segments, a carrier ring is pushed on, said carrier ring radially fixing said soft magnetic segments in said conductor construction by enclosing said ends of said soft magnetic segments in their respective trapezoidal grooves.

5. A process for manufacturing a multiphase electric machine as recited in claim 1, wherein said soft magnetic segments are cut in a fully automated manufacturing facility from a multi-layer strip of grain-oriented or amorphous iron strip, joined into axially stacked packets, and inserted into said self-supporting prefabricated conductor construction.

* * * * *